US010538240B2

(12) United States Patent
Cervantes et al.

(10) Patent No.: US 10,538,240 B2
(45) Date of Patent: Jan. 21, 2020

(54) ROAD VEHICLE CONVOY CONTROL METHOD, AND ROAD VEHICLE CONVOY

(71) Applicant: COMMISSARIAT A L'ENERGIE ATOMIQUE ET AUX ENERGIES ALTERNATIVES, Paris (FR)

(72) Inventors: Valery Cervantes, Grenoble (FR); Jerome Laborde, Lyons (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 145 days.

(21) Appl. No.: 15/756,142

(22) PCT Filed: Aug. 31, 2016

(86) PCT No.: PCT/FR2016/052162
§ 371 (c)(1),
(2) Date: Feb. 28, 2018

(87) PCT Pub. No.: WO2017/037387
PCT Pub. Date: Mar. 9, 2017

(65) Prior Publication Data
US 2018/0265078 A1    Sep. 20, 2018

(30) Foreign Application Priority Data
Sep. 1, 2015    (FR) ...................................... 15 58112

(51) Int. Cl.
*B60L 9/00*    (2019.01)
*B60W 30/045*    (2012.01)
(Continued)

(52) U.S. Cl.
CPC ............. *B60W 30/045* (2013.01); *B60D 1/30* (2013.01); *B60D 1/481* (2013.01); *B60K 7/0007* (2013.01);
(Continued)

(58) Field of Classification Search
CPC .... B60W 30/045; B60W 10/08; B60W 10/30; B60W 2300/14; B60W 2520/22;
(Continued)

(56) References Cited

U.S. PATENT DOCUMENTS 4,688,818 A *   8/1987   Grassmuck ........ B62D 53/0871
                                                        180/419
6,523,911 B1 *  2/2003   Rupp ........................ B60T 7/20
                                                        188/112 A
(Continued)

FOREIGN PATENT DOCUMENTS

FR    2 475 487 A1    8/1981

OTHER PUBLICATIONS

International Search Report dated Nov. 22, 2016 in PCT/FR2016/052162 filed Aug. 31, 2016.

*Primary Examiner* — Shardul D Patel
(74) *Attorney, Agent, or Firm* — Oblon, McClelland, Maier & Neustadt, L.L.P.

(57) ABSTRACT

A road vehicle convoy control method includes applying, on a hinge, a moment, an amplitude of which varies based on measured oscillations to absorb the measured oscillations. The moment is applied on the hinge by controlling an actuator of the hinge and jointly controlling: an electrical machine of a first wheel from a wheel set that belongs to part of a chassis that pivot in relation to another wheel because of the hinge to increase torque of the first wheel; and, simultaneously, an electrical machine of a second wheel from the same wheel set to keep the torque thereof constant or increase the torque of the second wheel less than the torque of the first wheel to apply the moment on the hinge in combination with the actuator.

15 Claims, 3 Drawing Sheets

(51) Int. Cl.
- *B60D 1/30* (2006.01)
- *B62D 12/02* (2006.01)
- *B62D 13/00* (2006.01)
- *B60D 1/48* (2006.01)
- *B62D 47/00* (2006.01)
- *B60K 7/00* (2006.01)
- *B60W 10/08* (2006.01)
- *B60W 10/30* (2006.01)

(52) U.S. Cl.
CPC ............ *B60W 10/08* (2013.01); *B60W 10/30* (2013.01); *B62D 12/02* (2013.01); *B62D 13/005* (2013.01); *B62D 47/006* (2013.01); *B60W 2300/14* (2013.01); *B60W 2520/22* (2013.01); *B60W 2710/083* (2013.01); *B60W 2720/22* (2013.01)

(58) Field of Classification Search
CPC ........ B60W 2710/083; B60W 2720/22; B60K 7/0007; B62D 47/006; B62D 12/02; B62D 13/005; B60D 1/481; B60D 1/30; B60D 1/62

USPC ........... 701/22, 36, 41, 50, 70, 72; 180/65.1, 180/65.51

See application file for complete search history.

(56) References Cited

U.S. PATENT DOCUMENTS

| | | | |
|---|---|---|---|
| 7,831,345 B2* | 11/2010 | Heino | B62D 1/28 299/1.9 |
| 2008/0246253 A1* | 10/2008 | Timmons | B62D 13/06 280/442 |
| 2012/0130573 A1* | 5/2012 | Wu | B60T 8/1708 701/22 |
| 2012/0193154 A1* | 8/2012 | Wellborn | B62D 59/04 180/14.2 |
| 2013/0079980 A1* | 3/2013 | Vuk | A01B 59/00 701/36 |
| 2015/0051795 A1* | 2/2015 | Keys, II | B60D 1/248 701/41 |

* cited by examiner

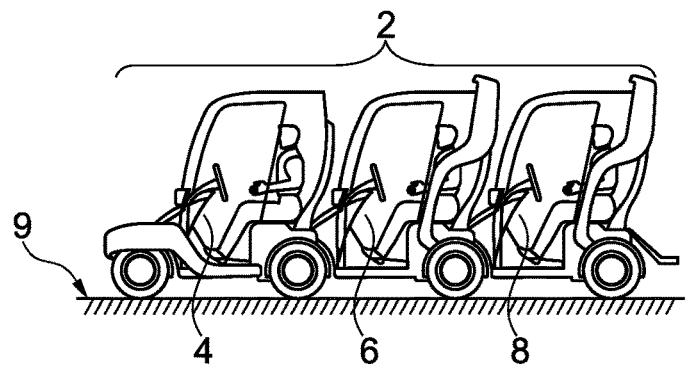
Fig. 1A
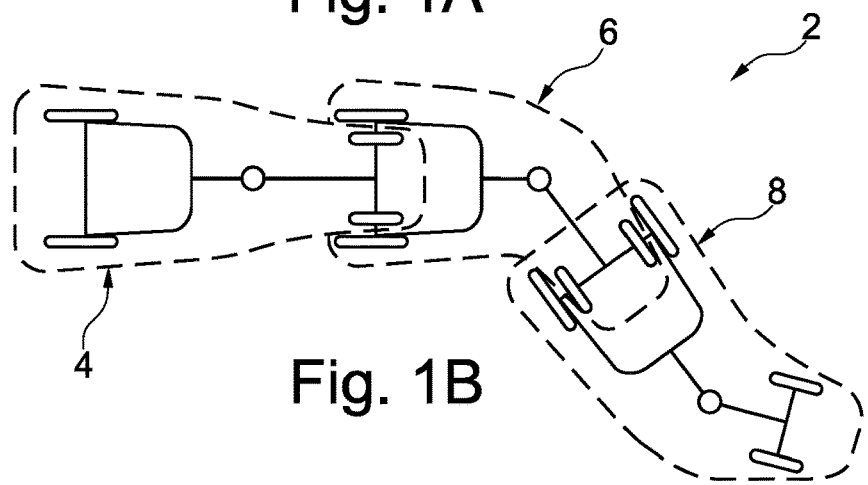
Fig. 1B
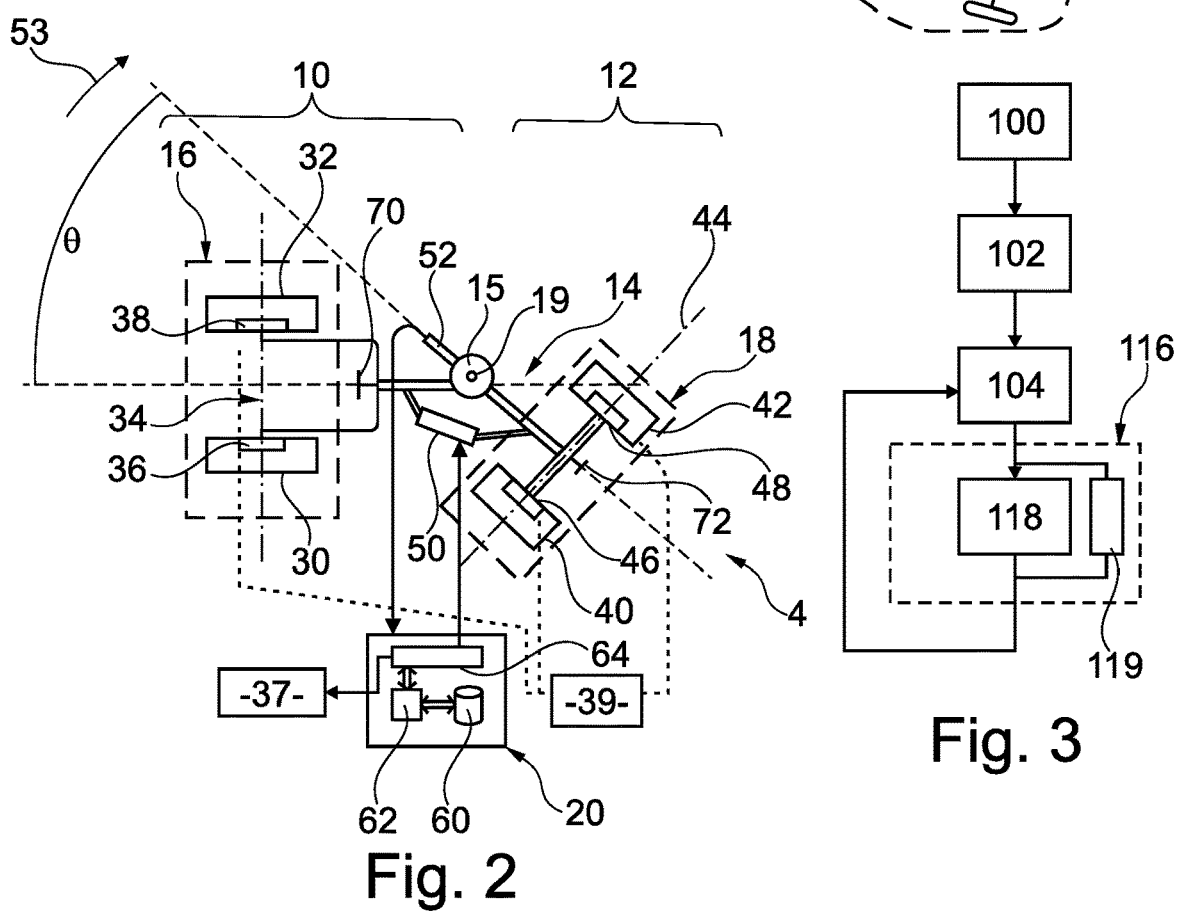
Fig. 2
Fig. 3

ROAD VEHICLE CONVOY CONTROL METHOD, AND ROAD VEHICLE CONVOY

The invention concerns a road vehicle convoy control method. The invention also concerns an information storage medium for the execution of that control method. The invention finally concerns a controllable road vehicle convoy.

Road vehicle convoys are known that are formed of a plurality of vehicles coupled together and able to move in rotation in yaw relative to one another. There are notably known road trains or urban transport systems such as poly-articulated buses. A problem with such convoys is that they can suffer an uncontrolled sway movement when they are circulating. This sway is reflected in lateral oscillations, i.e. oscillations perpendicular to the direction of movement of the convoy. Such sway on the one hand can lead to loss of control of the vehicle and on the other hand is dangerous for other vehicles and must be prevented.

Dissipative braking is braking in which the kinetic energy of the wheels is converted into heat. It is typically a question of braking using a brake plate.

The use of the actuator in addition to the brakes has the advantage of limiting the amplitude of the braking torque to be exerted on the wheels to damp the sway movement. In fact, this control method distributes the force to stabilize the convoy between the braked wheels and the controllable actuator of the controlled articulation consistently with the wheels. Accordingly, the repeated use of the control method from the application U.S. Pat. No. 4,688,818-A1 enables damping of the sway movement whilst slowing the convoy less than if only the brakes were used to damp this sway movement. This also enables the risk of loss of grip of a wheel to be limited since the braking torque is lower. However, because the use of the control method from the application U.S. Pat. No. 4,688,818-A1 slows the convoy, it cannot be used continuously and must be used only occasionally. This method is typically used only if the amplitude of the sway movement exceeds a predetermined threshold. The driver of the convoy must then accept a small sway movement, i.e. a sway movement the amplitude of which remains below this predetermined threshold.

State of the art is also known from:
US2013/079980A1, and
US2015/051795A1.

There is therefore a requirement for a road vehicle convoy control method that enables the sway movement to be damped whilst slowing the convoy even less.

The invention therefore concerns a road vehicle convoy control method according to claim 1.

Controlling the electrical machines of the first and second wheels of a wheel set to accelerate the first wheel without braking the second wheel of that set enables a torque to be created on the articulation without braking the wheels. Consequently, the claimed control method enables the sway movement to be damped as effectively as the control method from the application U.S. Pat. No. 4,688,818-A1 whilst braking the convoy even less on use of this method. It is then possible to use the claimed control method continuously without this leading to permanently slowing this convoy.

Embodiments of the invention can further have the following advantages:

In the claimed method, the absence of braking of the wheels of the convoy eliminates the risk of one or more of those wheels immobilizing. The risk of loss of grip of a wheel is also limited. Finally, the control method is simplified.

According to another aspect, the invention also concerns an information storage medium containing instructions for the execution of the steps a) and b) of the claimed method when those instructions are executed by an electronic computer.

According to another aspect, the invention also concerns a road vehicle convoy according to claim 11.

The invention will be better understood on reading the following description given by way of nonlimiting example only and with reference to the drawings, in which:

FIG. 1A is a diagram showing a road vehicle convoy in side view;

FIG. 1B is a diagram showing the convoy from FIG. 1A in simplified plan view;

FIG. 2 is a diagram showing one vehicle of the convoy from FIG. 1A;

FIG. 3 is a flowchart of a method of controlling the convoy from FIG. 1A;

In these figures, the same references are used to designate the same elements.

Figure 4:
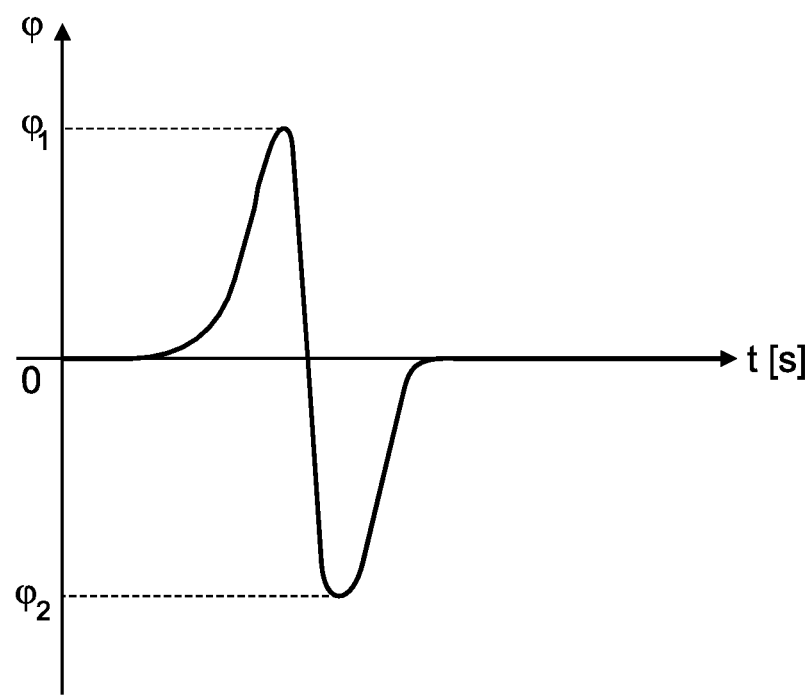
FIG. 4 shows the evolution over time of a steering angle of a head vehicle of the convoy from FIG. 1A in response to a control input from a user of that vehicle.

In the remainder of this description, features and functions well known to the person skilled in the art are not described in detail.

FIGS. 1A and 1B show diagrammatically an example of a road vehicle convoy 2. That convoy 2 includes:
a head vehicle 4, situated at the head of the convoy 2, and
a plurality of vehicles, termed follower vehicles, coupled two by two one behind the other to the rear of the vehicle 4. One of these follower vehicles is coupled directly to the rear of the vehicle 4.

The convoy 2 and the vehicle 4 are similar to those described in the application WO2014/135310. Only the technical details necessary for understanding the invention are therefore described in detail hereinafter. For simplicity, the convoy 2 includes only three vehicles: the vehicle 4 and two follower vehicles coupled one behind the other and to the rear of the vehicle 4, as will be described in more detail hereinafter. These follower vehicles bear the references 6 and 8, respectively. Here the vehicles 6 and 8 are identical to the vehicle 4. Only the latter will therefore be described in detail.

The convoy 2 is able to move along a rolling plane 9. The plane 9 is defined as being the plane passing through the surfaces of contact between the wheels of the vehicle 4 and the road on which that vehicle is traveling. Here the plane 9 is horizontal.

FIG. 2 shows the vehicle 4 in more detail. Here the vehicle 4 includes:
a chassis including a front chassis part 10 and a rear chassis part 12;
an articulation 14 between the parts 10 and 12;

a front wheel set 16 and a rear wheel set 18 fixed to the parts 10 and 12, respectively;

a control device 20 of the articulation 14.

In FIG. 2, the device 20 and various other control members are shown offset to one side of the vehicle 4 to make the figure more legible. However, in reality, this is not so and the device 20 like all the other control members is housed inside the vehicle 4.

The set 16 includes a left wheel 30 and a right wheel 32 aligned relative to one another about a transverse axis 34. The wheels 30 and 32 can be moved in rotation about a rotation axis of that wheel. The wheels 30 and 32 are generally aligned perpendicularly to the axis 34 when they are not steered. Their respective rotation axes are in this case aligned with this axis 34. Here the axis 34 is fastened to the part 10 with no degree of freedom.

Here the part 10 includes a device for steering the wheels 30 and 32. To simplify FIG. 2, this steering device is not shown there. This steering device is controllable by a driver of the vehicle 4 to modify a steering angle φ of the wheels 30 and 32 in order to steer the vehicle 4. For example, this steering device is that described in the international application WO2014/135310 with reference to FIG. 10.

The steering angle φ is defined here as being the acute angle between the vertical plane perpendicular to the rolling axis of that wheel and the vertical plane that contains a longitudinal axis of the part 10.

The longitudinal axis of the part 10 is defined as being an axis fixed with respect to the part 10 with no degree of freedom and aligned with the longitudinal axis of the vehicle 4 when the parts 10 and 12 are aligned with one another and the wheels 30, 32 are not steered. Here the longitudinal axis of the part 10 is an axis parallel to the rolling plane 9, perpendicular to the axis 34 and passing through the geometrical center of that axis 34. Here the geometrical center of the axis 34 is situated equidistantly from the respective centers of the wheels 30, 32. The respective rotation axis of each of these wheels 30, 32 passes through the center of that wheel.

Each wheel 30, 32 includes a controllable electrical machine able to function alternately as a motor or as a generator. When it is functioning as a motor, it drives this wheel in rotation to propel the vehicle 4. The machines of the wheels 30 and 32 bear the references 36 and 38, respectively. For example, the machines 36 and 38 are wheel-motors integrated into the respective hubs of the wheels 30, 32. These are direct current electrical machines, for example, such as series excitation commutator machines. Here each machine 36, 38 is able to produce a power greater than or equal to 2 kW or 7.5 kW or 15 kW.

The machines 36 and 38 are each able to produce a regenerative braking (also termed recovery braking) force when they function as a generator and the vehicle 4 is moving. Each machine 36, 38 is therefore able, in response to a control signal, to convert into electrical energy some of the rotational kinetic energy of the respective wheel to which it belongs. This slows the rotation of the wheel and brakes the vehicle 4.

For example, in a series excitation direct current electrical machine, regenerative braking is obtained by modifying the electrical voltage induced in the machine so that the induced electrical current, and therefore the direction of transfer of the power, changes direction.

The machines 36, 38 are connected to a control circuit 37 of the vehicle 4 that controls the operation of those machines independently of one another. For example, the circuit 37 includes controllable rheostats that enable independent control of the excitation current of the machines 36 and 38. Here the circuit 37 is able to control the machines 36, 38 so that the wheels 30, 32 turn at different speeds and, in particular, to exert the regenerative braking. To simplify FIG. 2, the connection of the machines to the circuit 37 is not shown.

Here each of the machines 36, 38 is also electrically connected to a power circuit 39 of the vehicle 4 able to supply electrical energy to power that machine. This circuit 39 includes for example an electrical energy storage device such as a rechargeable electrical storage battery. In particular, here this circuit 39 is able to collect and to store the energy generated by any of the machines 36, 38 during regenerative braking of the wheels 30 and/or 32.

The set 16 advantageously also includes controllable mechanical brakes for braking the wheels 30 and 32. When controlled accordingly, for example by a user of the vehicle 4, these mechanical brakes exert dissipative braking on a wheel by dissipating in the form of thermal energy at least some of the rotational kinetic energy of that wheel. They are for example drum brakes or caliper brakes or disk brakes.

The set 18 includes a left wheel 40 and a right wheel 42 aligned on a transverse axis 44. Here the set 18 is identical to the set 16 except that here the wheels 40 and 42 cannot be steered. The electrical machines of the wheels 40 and 42 bear the references 46 and 48, respectively. The machines 46 and 48 are also connected to the circuits 37 and 39.

The articulation 14 allows movement in rotation of the parts 10 and 12 relative to one another about a rotation axis 19 perpendicular to the plane 9. Here the axis 19 is vertical. For example, the articulation 14 includes a pivot connection 15 mechanically connecting the parts 10 and 12 and having as the rotation axis the axis 19. For example, the articulation 14 is that described in the international application WO2014/135310.

The articulation 14 further includes a controllable actuator 50. The actuator 50 mechanically connects the parts 10 and 12 to one another. This actuator 50 is able to lock the articulation 14 and to brake the rotation relative to one another of the parts 10 and 12 around the axis 19. In particular, the actuator 50 is able to exert an adjustable braking moment, around the axis 19, in response to a control signal emitted here by the device 20. On the other hand, the actuator 50 is not able to move the parts 10 and 12 relative to one another.

For example, the actuator 50 is a hydraulic cylinder with a variable damping coefficient, adjustable as a function of a control signal. Here this cylinder includes a reservoir of a fluid such as oil in which a piston is slidably mounted. This piston divides the reservoir into two parts, in a known manner. These two parts are fluidically connected to one another by a pipe on which there is a variable flow rate reducer, such as a solenoid valve. For example, this solenoid valve includes two proportional pressure relief valves mounted in opposite directions with check valves. This reducer can be controlled to modify this flow rate, which modifies the damping coefficient of the cylinder. This device is therefore much simpler than the active device involving the use of a hydraulic pump described in the U.S. Pat. No. 4,688,818.

A force exerted on the piston can therefore be selectively attenuated to a greater or lesser degree as a function of the value of the chosen damping coefficient. Here, the actuator 50 enables attenuation of the oscillation movement of the parts 10 and 12. The use of the actuator 50 then consumes very little electrical energy. Here, the energy consumed by the actuator 50 serves only to adjust friction coefficients.

Here, the articulation 14 further includes an angle sensor 52 that is able to measure the articulation angle, denoted θ, between the parts 10 and 12. For example, this angle θ is defined as the smallest oriented angle, measured in a plane parallel to the plane 9, between the longitudinal axes of the parts 10 and 12. The positive orientation direction of this angle θ here is shown by the arrow 53. In the example from FIG. 2, the angle θ therefore has a positive value.

Here this sensor 52 is connected to a data collection interface of the device 20.

The device 20 is notably able to measure an oscillation of the angle θ around an articulation angle setpoint $\theta_0$ thanks to the data supplied by the sensor 52. In response, the device 20 controls the actuator 50 so that it exerts on the articulation 14 an opposing moment relative to the measured oscillations to damp those oscillations.

For example, the device 20 includes:
an information storage medium 60;
a programmable electronic computer 62;
a data exchange interface 64.

The medium 60 contains the instructions for executing the method from FIG. 3. The computer 62 reads and executes the instructions stored on the medium 60. The interface 64 enables exchange and transfer of data coming for example from the sensor 52. For example, the computer 62 is an INTEL® 8086 family microprocessor.

Moreover, to exert the braking moment, the device 20 is able to control at least one of the machines 36, 38, 46 and 48 conjointly with controlling the actuator 50, to increase the rotation speed of one or the other of the wheels 30, 32, 40 and 42. For example, the device 20 is connected to the circuit 37 to deliver a control signal for the machines 36, 38, 46 and 48.

The device 20 is advantageously further programmed, when it detects that the vehicle 4 is at the head of the convoy 2, to control the actuator 50 so that it immobilizes the articulation 14 at an angle θ equal to 0° and to leave the driver of the vehicle 4 free to actuate the steering device of that vehicle 4. The parts 10 and 12 are then aligned with one another longitudinally and cannot pivot relative to one another around the axis 19. On the other hand, if the device 20 detects that the vehicle to which it belongs is not at the head of the convoy, then it controls the actuator 50 so as not to immobilize the articulation 14 and leaves that articulation free for application of the rotation moment.

Here, the vehicle 4 further includes front and rear couplings 70 and 72. Each coupling 70, 72 is movable alternately between coupled and uncoupled positions, for example in response to a control signal from a user of the convoy 2. The coupling 70 is able to cooperate with a rear coupling, for example identical to the coupling 72, installed at the rear of another vehicle. To this end, the couplings 70 and 72 have shapes complementary to one another. Here, the couplings 70 and 72 are anchored to the parts 10 and 12 respectively with no degree of freedom in rotation in yaw.

By rotation in yaw is meant here a movement of rotation only about an axis perpendicular to the plane 9.

For example, the couplings 70 and 72 are those described in international application WO2014/135310.

Here, the vehicles 4, 6 and 8 are coupled two by two by means of the respective couplings 70 and 72 carried by those vehicles. For example, the vehicle 6 is attached to the rear of the vehicle 4 by means of the couplings 72 and 70 of the vehicles 4 and 6, respectively. The vehicle 8 is attached to the rear of the vehicle 6.

Hereinafter, to refer to the elements of the vehicle 6, the same reference number is used as that for the corresponding element of the vehicle 4 with the suffix "b". For example, the articulation 14 of the vehicle 6 bears the reference 14b. The same procedure is followed for the vehicle 8 using the suffix "c".

An example of the operation of a method for damping the sway movement of the convoy 2 will now be described with reference to the FIG. 3 flowchart and with the aid of FIGS. 1 and 2. For simplicity, this method is described only with reference to the vehicle 8 that is at the tail end of the convoy 2. However, everything that is described with reference to this vehicle 8 can easily be transposed to the situation of the vehicle 6.

First of all, during a step 100, the convoy 2 is formed by attaching the vehicles 4, 6 and 8 by means of their respective couplings 70 and 72. The device 20 of the vehicle 4 detects that this vehicle is at the head of the convoy 2 and commands the immobilization of the articulation 14 in the position in which the longitudinal axes of the parts 10 and 12 are aligned. The devices 20b and 20c detect that the vehicles 6 and 8, respectively, are not at the head of the convoy 2. The articulations 14b and 14c are then free to pivot and allow movement in rotation. On the other hand, the devices 20b and 20c inhibit actuation of the steering devices of the vehicles 6 and 8 by a driver of those vehicles. The steering angle of the wheels 30b, 32b, 30c and 32c is typically immobilized in a position in which the rolling axis of each of these wheels is parallel to the axis 34b or 34c.

Then, during a step 102, the convoy 2 begins to move and is moved over the plane 9, for example in a straight line. Here, the circuit 39 powers the machines 36, 38, 46 and 48 to supply a torque intended to rotate the wheels 30, 32, 40 and 42 about their respective rotation axes at a predetermined speed and in the same direction. The same applies to the vehicles 6 and 8.

During this movement, if the method described here were not used, the convoy 2 could exhibit a sway movement. By sway movement is meant a movement fluctuating in time of one or more vehicles of the convoy 2 in a direction parallel to the plane 9 and essentially perpendicular to the direction of movement of the convoy 2.

For example, this sway movement is triggered following steering of the wheels 30 and 32 commanded by a user of the vehicle 4. It can also be triggered by a side wind, another vehicle overtaking or a variation in the camber of the road surface.

FIG. 4 shows diagrammatically the evolution of the angle φ of the wheels 30 and 32 as a function of time t. Here, the wheels 30 and 32 are initially aligned and have a zero steering angle. They are then steered in one direction by an angle $\varphi_1$ and then, in a second time interval, are steered in the opposite direction by an angle $\varphi_2$ that is equal to $-\varphi_1$. Finally, the angle φ reverts to its initial zero value. In response, a sway movement is propagated to the vehicles 6 and 8. The front and rear chassis parts of the vehicles of the convoy 2 pivot relative to one another about their respective articulations with an oscillatory movement.

Figure 5:
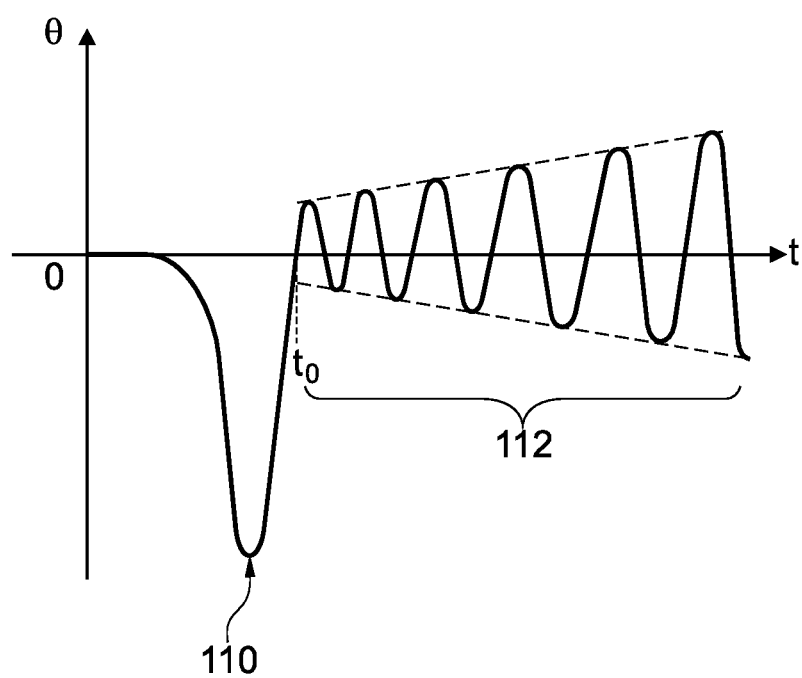
FIGS. 5 and 7 show the evolution over time of an articulation angle of a follower vehicle of the convoy from FIG. 1A in response to the steering shown in FIG. 4, respectively with and without application of the method from FIG. 3.

FIG. 5 shows the evolution of the value of the angle θ of the articulation 14c of the vehicle 8 as a function of time t, in response to the steering of the wheels 30 and 32 from FIG. 4, when no trajectory correction is applied. A peak (arrow 110) is observed that corresponds to the steering angle variation of the wheels 30 and 32. Then, in a second time period, starting from a time $t_0$, oscillations of this value of the angle θ are observed that persist after this steering is terminated (area 112). Here these oscillations are periodic and have a sinusoidal form the amplitude of which increases in a linear manner with time. In this situation the sway is uncontrolled and can cause loss of control of the convoy 2. This amplitude increase can be amplified by the sway movement resonating with the suspensions of the vehicle.

During this movement, in a step 104 (FIG. 3), the sensor 52c measures this oscillation of the parts 10c and 12c about the axis 19c.

Then, in a step 116, the measured data is analyzed automatically by the device 20c. The latter calculates automatically, from the measurements from the sensor 52c and a setpoint $\theta_0$ for the value of the angle $\theta$ of the articulation 14c, a total yaw damping moment M about the axis 19c that must be applied to the articulation 14c to oppose these oscillations. In this description, the value of the total moment M is defined as being the projection onto the vertical axis 19c, oriented upward, of the following vector product:

$$\vec{A_i P} \wedge \vec{F}$$

in which P is the point of application of the force, $A_i$ is the orthogonal projection of the point P onto the axis 19c and F is the applied force.

For example, the setpoint $\theta_0$ is chosen as being equal to the mean value of the angle $\theta$ averaged over a predefined duration. In the example considered, the mean value is zero. The setpoint value $\theta_0$ is therefore equal to zero.

To be more precise, in the step 116, the device 20c automatically delivers a control signal on the one hand to the actuator 50c and on the other hand to the circuit 37c to attenuate or even to eliminate the oscillations. These control signals, delivered to the actuator 50c and to the circuit 37c, depend on the difference between the value of the measured angle $\theta$ and the setpoint $\theta_0$.

For example, the device 20c includes a PID type proportional corrector that receives as input the value of the measured angle $\theta$ and the setpoint $\theta_0$ and then supplies as output the estimated total moment M to be applied to the articulation 14c to attenuate the oscillations. Generally speaking, the value of the control signal therefore increases with the difference between the measured angle $\theta$ and the setpoint $\theta_0$. In this example, the steps 104 and 116 are reiterated in real time, as and when the oscillations are measured.

Figure 6:
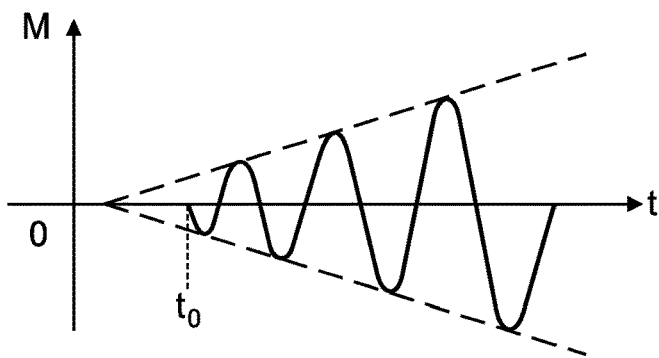
FIG. 6 is an example of a control signal delivered by a control device of the convoy from FIG. 1B to limit oscillations of the articulation angle seen in FIG. 5.

FIG. 6 shows an example of the value of the total moment M that is calculated by the device 20c. Here the moment M is a periodic signal which, like the evolution of the value of the angle $\theta$ from FIG. 5, has an amplitude the absolute value of which increases in a linear manner.

The device 20c then automatically divides the total moment M between:

a moment MA that must be applied by the actuator 50c to the articulation 14c, and a moment MR that must be applied to the articulation 14c with the aid of the electrical machines of the vehicle 8.

The sum of the moments MA and MR is equal to the total moment M. The moment MA is typically equal to X*M and the moment MR is typically equal to (1−X)*M, where X is a real number between zero and one and M is the calculated value of the total moment M. The symbol "*" designates the multiplication mathematical operation. Depending on the phases of the oscillation, the division factor X of the total moment between the actuator 50c and the electrical machines of the vehicle 8 is different. For example, when the absolute value of the difference $|\theta-\theta_0|$ between the angle $\theta$ and the setpoint $\theta_0$ increases, X is typically, and generally systematically, between 0.2 and 1 inclusive or between 0.2 and 0.9 inclusive, and preferably between 0.5 and 0.7 inclusive. Here, X is chosen equal to 0.5. If the difference $|\theta-\theta_0|$ decreases, X is equal to zero. Following this division, a control signal is sent to the circuit 37c to control the electrical machines of the vehicle 8 so as to apply the moment MR to the articulation 14c. In parallel with this, a control signal is also sent to the actuator 50c to apply the moment MA to the articulation 14c.

In response to these control signals, during an operation 118, the actuator 50c applies the braking moment MA. In this embodiment, as long as the difference $|\theta-\theta_0|$ increases, the applied moment MA is non-zero. Conversely, when the difference $|\theta-\theta_0|$ decreases, the actuator 50c exerts a braking moment MA the amplitude of which is typically two or ten times less than the amplitude of the braking moment MA applied when the difference $|\theta-\theta_0|$ increases. When the difference $|\theta-\theta_0|$ decreases, the amplitude of the braking moment is preferably zero or virtually zero. Here, to this end, the device 20c controls the solenoid valve which makes it possible to adjust the coefficient of friction of the cylinder. When the difference $|\theta-\theta_0|$ increases, the coefficient of friction of the cylinder is adjusted to a high value to brake this increase. Conversely, when the difference $|\theta-\theta_0|$ decreases, the coefficient of friction of the cylinder is adjusted to a value ten or fifty times lower. The amplitude of the moment MA applied by the actuator 50c therefore has a quasi-periodic form, the period of which depends on the period of the oscillations 112.

Conjointly with this application of a braking moment by the actuator 50c, during an operation 119, in response to the control signal that is intended for it, the circuit 37c controls the electrical machines of the vehicle 8 so as to exert the moment MR on the articulation 14c. This moment MR is of the same sign as and in phase with the angle $\theta$. To this end, in this embodiment, the circuit 37c controls only the machines 46c and 48c. Moreover, in this embodiment, controlling an electrical machine consists only in adjusting its torque to increase the rotation speed of the wheel or to maintain that speed constant. To be more precise, the circuit 37c controls at least one of the machines 46c and 48c in such a manner as to cause a difference between the rotation speeds of the wheels 40c and 42c. This difference between the rotation speeds of the wheels 40c and 42c applies the moment MR to the articulation 14c.

For example, in the case of an angle $\theta$ like that shown in FIG. 2, in response to the received control signal, the circuit 37c controls the machine 46c so that it maintains constant the rotation torque at the wheel 40c, which is on the inside of the turn. The rotation speed of the wheel 40c is therefore maintained substantially constant. In parallel with this, the machine 48c is controlled by the circuit 37c so as to increase the torque that it supplies to the wheel 42c that is on the outside of the turn. The wheel 42c therefore accelerates and its rotation speed increases.

In parallel with this, here, the circuit 37c controls the torque of the machines 36c and 38c to maintain constant the rotation speeds of the wheels 30 and 32. This facilitates controlling the application of the moment MR to the articulation 14c.

The operations 118 and 119 are repeated, where appropriate with different values of the moment to be applied, until the oscillations of the angle $\theta$ disappear. The oscillation is said to disappear if the absolute value of the difference between the value of the angle $\theta$ and the setpoint $\theta_0$ is less than or equal to $0.1*\theta_0$ or $0.05*\theta_0$.

In parallel with the steps 104 and 116, the actuator 50b and the machines 46b and 48b of the vehicle 6 are controlled in a similar manner to damp the oscillations of the angle of the articulation 14b.

The conjugate action of the actuator 50c and the machines 46c, 48c thus leads to the total moment M being applied to the articulation 14c at each given time which opposes the oscillations of the angle θ. Eliminating the oscillations of each of the vehicles 6 and 8 therefore eliminates the sway movement of the convoy 2.

The operation 119, in addition to the operation 118, enables a damping moment in yaw to be exerted over all the phases of the oscillation and not only during the periods in which the angle difference |θ−θ$_0$| increases. This therefore enables faster damping of these oscillations. Moreover the simultaneous use of the actuator 50c and the electrical machines 46c, 48c enables reduction of the risks of loss of control in that, in the most severe case where grip is lost at both wheels, the articulation can still be controlled by the actuator 50c. Moreover, this control method eliminates or very greatly reduces the braking of the convoy and thus enables this control method to be applied continuously over much longer periods before this leads to stopping of the convoy or to perceptible deceleration of the convoy. This also reduces wear of the brakes.

In the particular case where the acceleration of the rotation speed of each wheel is adjusted to cancel the absence of acceleration of that same wheel during a preceding iteration of the operation 119, then the speed of the convoy can be maintained constant whilst applying the control method continuously.

Finally, using a cylinder capable only of braking the movement in rotation of the parts 10c and 12c about the axis 19c limits the energy consumption of the vehicle. In fact, for this it simply suffices to control the coefficient of friction of this cylinder. This consumes much less energy than if it were necessary to move the parts 10c and 12c relative to one another with the aid of this cylinder.

Figure 7:
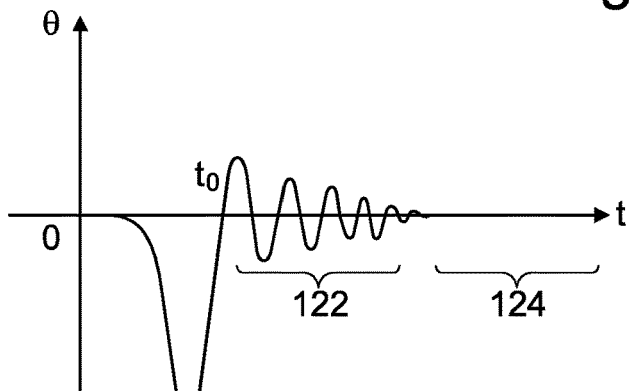

FIG. 7 shows the evolution of the value of the angle θ of the articulation 14c of the vehicle 8 over time, in response to the steering of the wheels 30 and 32 shown in FIG. 4, when the method from FIG. 3 is applied. As before, there is seen first a peak 120 of the value of the angle θ, identical to the peak 110 (FIG. 4). Then, in a second time period, oscillations are seen (area 122) that are rapidly attenuated. The value of the angle θ tends finally toward a constant value (area 114) that corresponds to the setpoint value θ$_0$.

Figure 8:
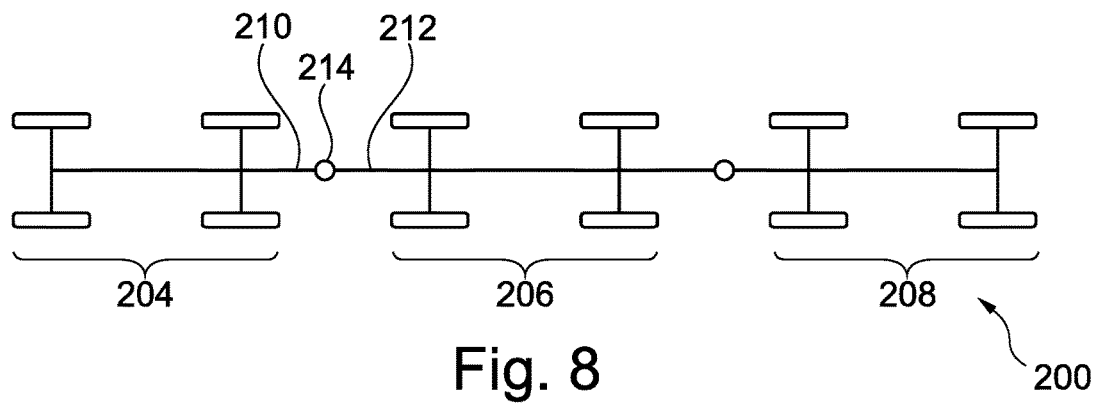
FIG. 8 shows another embodiment of the convoy from FIGS. 1A and 1B.

FIG. 8 shows a convoy 200 that can replace the convoy 2. In this convoy 200, in contrast to the convoy 2, the vehicles are not articulated but each coupling includes an articulation. Thus the vehicle 4 is replaced by a vehicle 204 that does not include the articulation 14. Similarly, the vehicles 6 and 8 are replaced by vehicles 206 and 208, for example identical to the vehicle 204. The parts 10 and 12 of the same vehicle are not articulated to one another and then cannot move in rotation relative to one another in normal operation of the convoy. In this embodiment, the couplings 70 and 72 are replaced by couplings 210 and 212 which, when they are coupled to one another, allow rotation in yaw about an axis perpendicular to the rolling plane of the convoy. These couplings 210 and 212 then form an articulation 214 that has the same function as the articulation 14. This articulation 214 is for example identical to the articulation 14. Everything that has been described with reference to this articulation 14 and to the rotation movement of the parts 10 and 12 relative to one another applies to this articulation 214 and to the rotation of the chassis parts connected directly to one another by these couplings 210 and 212. In particular, the actuator 50 then connects directly to one another the chassis of the vehicles coupled to one another. The device 20 can then be placed on one or the other of the vehicles that are attached to one another by means of these couplings. The control method of the actuator 50 and the electrical machines housed in the wheels to prevent the sway of the convoy is then identical to that from FIG. 3.

Figure 9:
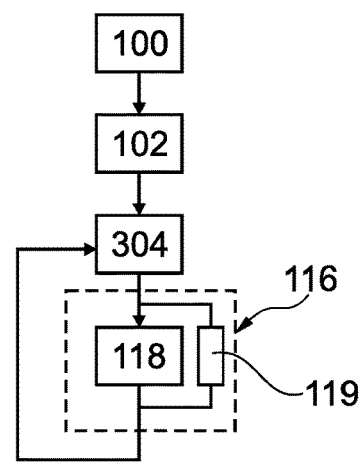
FIG. 9 is a flowchart of another embodiment of the method from FIG. 3.

FIG. 9 is a flowchart of a method that can replace the method from FIG. 3. In this method, the step 104 is replaced by a step 304 in which the setpoint θ$_0$ is determined differently. Here this setpoint θ$_0$ is determined from the calculation of the kinematic trajectory followed by the vehicle 4.

One way of determining this trajectory is for example to measure a magnitude representing the steering radius of the vehicle 4 during the movement of that vehicle 4. This representative magnitude is for example the angle φ. From this value, the setpoint θ$_0$ of each follower vehicle 6 and 8 of the convoy 2 is determined progressively with the aid of the following formula: θ$_0$=θ$_{ar}$−θ$_{av}$, in which:

θ$_{ar}$ is the angle between the longitudinal axis of the part 12 and an axis of a system of axes R fixed in space, θ$_{av}$ is the angle between the longitudinal axis of the part 10 and this same axis of the system of axes R.

For the vehicle 4, at the head of the convoy, the articulation 14 of the vehicle 4 is immobilized. Under these conditions, the coordinates X$_s$, Y$_s$ of the center of the rear set 18, i.e. of the middle of the axis 44, as a function of the coordinates X, Y of the center of the front set 16, are given by the following equations:

$$X_s = X - L\cos(\theta_{ar})$$

$$Y_s = Y - L\sin(\theta_{ar})$$

in which:

L is the wheelbase of the vehicle 4, defined as being the distance, measured along the longitudinal axis of the vehicle, between the axes 34 and 44.

The value of the angle θ$_{ar}$ of the vehicle 4 is determined by solving the following system of differential equations, for example by means of the device 20b:

$$\theta_{ar} = \frac{\int (\dot{Y}\cos(\theta_{ar}) - \dot{X}\sin(\theta_{ar}))dt}{L}$$

$$\dot{X} = V\cos(\theta_{av})$$

$$\dot{Y} = V\sin(\theta_{av})$$

$$\theta_{av} = \theta_{ar} - \varphi$$

in which V is the velocity of the vehicle 4.

For the follower vehicles 6 and 8, the coordinates X$_s$, Y$_s$ of the center of the rear set 18, as a function of the coordinates X, Y of the center of the front set 16, are given by the following equations:

$$X_s = X - l_1\cos(\theta_{av}) - l_2\cos(\theta_{ar})$$

$$Y_s = Y - l_1\sin(\theta_{av}) - l_2\sin(\theta_{ar})$$

in which:

l$_1$ is the distance between the axis 19 and the center of the front set 16, and l$_2$ is the distance between the axis 19 and the center of the rear set 18 such that l$_1$+l$_2$=L.

For the follower vehicles, the coordinates X, Y of the center of the front set are equal to the coordinates X$_s$, Y$_s$ of the center of the rear set to which the follower vehicle is coupled. Moreover, because here the couplings 70 and 72 do not allow any degree of freedom in rotation in yaw, the angle $\theta_{av}$ of the follower vehicle is equal to the angle $\theta_{ar}$ of the vehicle to the rear of which it is coupled.

The value of the angle $\theta_{ar}$ of the follower vehicle is determined by solving the following system of differential equations, for example by means of the device 20b:

$$\theta_{ar} = \frac{1}{l_2} \int \dot{Y}\cos(\theta_{ar}) -$$
$$l_1\theta^*_{av}\cos(\theta_{av})\cos(\theta_{ar}) - \dot{X}\sin(\theta_{ar}) - l_1\theta^*_{av}\sin(\theta_{av})\sin(\theta_{ar}) dt$$
$$\dot{X} = V\cos(\theta_{av})$$
$$\dot{Y} = V\sin(\theta_{av})$$

in which V is the velocity of the vehicle 4.

Starting from the head vehicle 4 and working toward the tail vehicle 8, the device 20 can therefore calculate progressively the angles $\theta_{av}$ and $\theta_{ar}$ of each follower vehicle. After this, the setpoint $\theta_0$ of each follower vehicle is calculated with the aid of the following equation:

$$\theta_0 = \theta_{ar} - \theta_{av}$$

Numerous other embodiments are possible. For example, the convoy 2 is different. It can include a different number of vehicles. The vehicles 4, 6 and 8 can be different from one another.

The articulation 14 can be different from that described. In one variant, the immobilizing of the articulation 14 is omitted for the vehicle 4. In this case, the setpoint $\theta_0$ of the vehicle 4 is calculated as described for the follower vehicles.

The device 20 can be produced differently. In one variant, the total moment M to be applied is calculated by a single one of the devices 20, 20b and 20c. The latter then transmits to each of these other devices the value of the moment to be applied to the corresponding articulation. The devices 20, 20b and 20c can to this end be connected together by a data exchange link.

The device for steering the wheels 30 and 32 can be different. It can be an Ackermann steering device.

The machines 36, 38, 46, 48 can be different. For example, in one variant, asynchronous electrical machines or permanent magnet machines are used. In one variant, only one of the sets 16 and 18 includes electrical machines for driving the wheels of this set in rotation. In one variant, there can therefore be only the machines 46 and 48, or the machines 36 and 38.

The number of wheels carried by the sets 16 and 18 can be different. For example, the set 16 includes two left wheels and two right wheels, twinned in pairs.

The number of wheel sets mounted directly on the same front or rear part of the chassis can also be greater than one. For example there can be two wheel sets mounted in tandem on the same part of the chassis. In this case, the method described above applies to only one of these wheel sets or, simultaneously, to a plurality of the wheel sets mounted on the same part of the chassis.

The manner of calculating the total moment M to be applied can be different. For example, the device 20 can take into account, as an input parameter for this calculation, environmental conditions such as the grip on the road surface or dynamic properties of the convoy 2 such as the number of vehicles or the mass of those vehicles. The device 20 can also take into account measurements from inertial sensors fixed to each of the vehicles, a trajectory determination device, an accelerometer that measures the transverse acceleration of the vehicle or a sensor for sensing the angular speed in yaw of the articulation. The step 104 is then modified accordingly.

To measure the oscillations, it is not necessary to measure directly the oscillations of the angle $\theta$. In fact, it suffices to measure physical magnitudes representing these oscillations. For example, the sensor 52 is replaced by one or more sensors that measure those oscillations indirectly. The sensor 52 can typically be replaced by a sensor that measures the angular speed in yaw of the chassis part concerned or the derivative with respect to time of the angle $\theta$. The angle setpoint $\theta_0$ is then replaced by an angular speed in yaw setpoint of the chassis part concerned or by a setpoint for the derivative with respect to time of the angle $\theta$.

The movement of oscillation of the angle $\theta$ around the articulation of a vehicle can be measured differently. For example, it is measured on the basis of the rotation speed of the wheels of the vehicle, or of the lateral acceleration of the vehicle, either separately or in conjunction with the measurement of the angle by the sensor 52. For example, this calculation is performed as described in the patent U.S. Pat. No. 6,523,911B1 with reference to FIG. 9 of that patent. The device 20 and the sensor 52 are then adapted accordingly.

The number X used to divide the total moment M automatically between the moments MA and MR, when the absolute value of the difference $|\theta-\theta_0|$ increases, is not necessarily a constant independent of time and the values of the angles $\theta$ and $\theta_0$. For example, in one variant, the value of the number X varies as a function of the difference $|\theta-\theta_0|$ when that difference increases or as a function of a duration $\delta t$ counted down from the moment at which the difference $|\theta-\theta_0|$ has begun to increase. The value of the number X can also vary as a function of other parameters or characteristics of the vehicle convoy.

The manner of applying the moment MR can also be different. For example, during the operation 119, the circuit 37c controls the torque of the machines 46c and 48c to accelerate at the same time the rotation speed of the wheels 40c and 42c. However, the acceleration of one of these wheels is then greater than the acceleration of the other of these wheels. The control method can therefore be used whilst accelerating the convoy.

In another embodiment, the unit 37c controls only the machines 36c and 38c instead of the machines 46c and 48c to exert the moment MR. Finally, the control unit 37c can also control simultaneously the machines 36c, 38c, 46c and 48c to exert this moment MR.

In another variant, during the operation 119, the machine 36 of a follower vehicle is controlled simultaneously with the machine 46 of the vehicle that precedes it. Similarly the machine 38 of a follower vehicle can be controlled simultaneously with the machine 48 of the vehicle that precedes it.

It is also possible to control the moment MR generated by the wheels with a phase difference relative to the angle $\theta$. The moment MR can therefore be in phase advance of the angle $\theta$ by from 0 to 90°. It is also possible to control the application of the moment MR generated by the wheels with a phase delay from 0 to 45° relative to the angle $\theta$.

It is also possible to begin to apply the braking moment MA exerted by the actuator 50c when the difference $|\theta-\theta_0|$ decreases and just before the value of this difference cancels out.

The manner of calculating and/or applying the moment M is not necessarily the same for all the vehicles of the convoy 2.

The actuator 50 can be different. In particular, in one variant, the actuator 50 is able to supply work for moving the parts 10 and 12 relative to one another in rotation about the axis 19 to achieve a given angle value θ, in response to a control signal emitted by the device 20. For example, the actuator 50 includes a controllable hydraulic cylinder the opposite ends of which are anchored to the parts 10 and 12, respectively, with no degree of freedom. In another variant, the actuator 50 is not a hydraulic cylinder but a magneto-rheological damper.

The oscillations of the value of the angle θ can have a form different from that described. For example, they are not periodic. Their amplitude need not be modulated. They need not increase continuously.

The couplings 70 and 72 are not necessarily controllable. They can also be different.

In one variant, during the step 104 or the step 304, the setpoint $θ_0$ is determined differently. Alternatively, during the step 304, the trajectory is obtained by means of a geolocation device, for example the global positioning system (GPS).

The mechanical brakes can be omitted.

In another variant, in the case of an angle θ like that shown in FIG. 2, in response to the received control signal the circuit 37c controls the machine 46c so that it ceases to supply a rotational torque to the wheel 40c that is on the inside of the turn and, instead, exerts regenerative braking on the wheel 40c. The machine 46c then functions as an electricity generator and converts at least some of the rotational kinetic energy of the wheel 40c into electrical energy, which is collected and stored in the circuit 39c. This reduces the rotation speed of the wheel 40c. In parallel with this, the machine 48c is advantageously controlled by the circuit 37c so as to accelerate the rotation speed of the wheel 42c that is on the outside of the turn. Even more advantageously, to produce this acceleration, the circuit 39c supplies the machine 48c with the energy generated by the machine 46c during regenerative braking. During the next iteration of the operation 119, the machine that was operating as a generator can operate as a motor and vice versa. Moreover, using simultaneously regenerative braking on one wheel and acceleration on another wheel improves the roadholding of the vehicle 8. In fact, the braking force exerted by the wheel to obtain the same yaw damping moment is then smaller, which reduces the risk of loss of grip in relation to the case where braking is applied to only one of the wheels. In another embodiment, it is the acceleration of the wheel 42c that is omitted during the operation 119. The acceleration of the wheel 42c can also be produced without using the energy generated by the machine 46c. According to another variant, the acceleration of the wheel 42c can be produced by immediately consuming the energy generated by the machine 46c without the latter being stored in the circuit 39. When the maximum braking torque that one of the electrical machines can exert through regenerative braking is reached, regenerative braking is then advantageously complemented by dissipative braking produced by means of the mechanical brakes. This dissipative braking can become necessary, for example in emergency situations, when the value of the angle θ departs too much from the setpoint value $θ_0$ and must be corrected rapidly and the actuator 50c is not in a position to produce this correction.

The manner of producing regenerative braking of a machine can be different. Generally speaking, the person skilled in the art knows that it depends on the nature of the electrical machine used and of the circuit 37.

The invention claimed is:

1. A method of controlling a road vehicle convoy, including:
 a first road vehicle, situated at a head of a convoy and including a wheel set,
 a plurality of second road vehicles, coupled two by two one behind the other, one of the second vehicles being coupled to the rear of the first vehicle, each second vehicle including:
  a wheel set,
  an articulation allowing movement in rotation of at least part of a chassis of the second vehicle relative to at least part of the chassis of the vehicle preceding it about a rotation axis perpendicular to the rolling plane of the convoy;
 for each articulation, a controllable actuator that mechanically connects the chassis parts that pivot relative to one another about the rotation axis of this articulation, the actuator configured to exert an adjustable moment on this articulation;
 the method comprising, for each articulation:
 a) measuring oscillations of an articulation angle about an articulation angle setpoint;
 b) applying, to the articulation, a moment with an amplitude that varies as a function of the measured oscillations to damp the measured oscillations, the moment being applied to the articulation by controlling the actuator of that articulation;
 each wheel of the wheel set of each vehicle including a controllable electrical machine for driving the wheel in rotation to propel the vehicle, each of the machines of the same wheel set being controllable independently of other machine or machines of that wheel set; and
 during the applying b), for each articulation, applying the moment includes, conjointly with control of the actuator of that articulation, control of:
  the electrical machine of a first wheel of one of the wheel sets that belongs to one of the chassis parts that pivot relative to one another due to this articulation, to increase torque of that first wheel, and simultaneously
  the electrical machine of a second wheel of the same wheel set to maintain its torque constant or to increase the torque of this second wheel less than the torque of the first wheel to apply the moment to that articulation, in conjunction with the actuator.

2. The method as claimed in claim 1, wherein, during the applying b):
 the electrical machine of the first wheel is controlled to increase its rotation speed more rapidly than the rotation speed of the second wheel, and simultaneously
 the electrical machine of the second wheel is controlled to maintain a zero acceleration of its rotation speed.

3. The method as claimed in claim 1, wherein, during the applying b), none of the electrical machines of the convoy is controlled to operate as an electricity generator.

4. The method as claimed in claim 1, further comprising:
 automatic division of the moment for damping the measured oscillations between:
  a moment MA equal to X*M that must be applied by the actuator to the articulation, and
  a moment MR equal to (1−X)*M that must be applied to the articulation with aid of the electrical machines, wherein M is the total moment to be applied to the articulation to damp the oscillations and X is a real number between 0.2 and 1 inclusive when the absolute value of the difference $|θ-θ_0|$ increases and is equal to zero when the difference $|\theta-\theta_0|$ decreases, wherein $\theta$ is the angle of the articulation and $\theta_0$ is the articulation angle setpoint; then applying the moment MA to the articulation by controlling the actuator and, conjointly, applying of the moment MR to the articulation by controlling the electrical machines.

5. The method as claimed in claim 4, wherein the real number X is systematically between 0.2 and 0.9 inclusive when the absolute value of the difference $|\theta-\theta_0|$ increases.

6. The method as claimed in claim 1, further comprising:
automatically acquiring the trajectory followed by the first vehicle of the road convoy; and
during the applying b), the angle setpoint of each articulation is calculated as a function of the acquired trajectory.

7. The method as claimed in claim 6, wherein the trajectory is acquired by measuring a magnitude representing steering radius of the first vehicle.

8. The method as claimed in claim 1, wherein the measuring a) includes calculating the angle setpoint for this articulation and the applying b) includes slaving the actuator of this articulation to the calculated angle setpoint.

9. The method as claimed in claim 1, wherein the actuator is a cylinder with a controllable damping coefficient configured to brake rotation of the chassis parts that it mechanically connects to one another and incapable of moving in rotation relative to one another those same chassis parts.

10. A non-transitory computer readable storage medium, comprising instructions for execution of the method as claimed in claim 1 when those instructions are executed by an electronic computer.

11. A road vehicle convoy, comprising:
a first road vehicle, situated at a head of a convoy;
a plurality of second road vehicles, coupled two by two one behind the other, one of the second vehicles being coupled to the rear of the first vehicle, each second vehicle including an articulation allowing movement in rotation of at least part of the chassis of the second vehicle relative to at least part of the chassis of the vehicle preceding it about a rotation axis perpendicular to the rolling plane of the convoy;
each of the first and second vehicles including a wheel set;
for each articulation of the convoy:
a controllable actuator that mechanically connects between its ends the chassis parts that pivot relative to one another about the rotation axis of this articulation, this actuator being configured to exert an adjustable moment on the articulation,
a sensor configured to measure oscillations of an angle of this articulation about an articulation angle setpoint, and
a control device configured to control the actuator of this articulation to exert on this articulation a moment with an amplitude that varies as a function of the measured oscillations to damp the measured oscillations; wherein:
each wheel of each wheel set includes a controllable electrical machine for driving this wheel in rotation to propel the vehicle, each of the machines of the same wheel set being controllable independently of other machine or machines of that wheel set, and
for each articulation, the control device is further configured to apply the moment, conjointly with control of the actuator of that articulation, to control:
the electrical machine of a first wheel of one of the wheel sets that belongs to one of the chassis parts that pivot relative to one another due to the articulation, to increase the torque of that first wheel, and simultaneously
the electrical machine of a second wheel of the same wheel set to maintain its torque constant or to increase the torque of this second wheel less than the torque of the first wheel so as to apply the moment to that articulation, in conjunction with the actuator.

12. The convoy as claimed in claim 11, wherein:
the first and second vehicles are identical and each of these vehicles includes:
front and rear chassis parts, each including a wheel set of the vehicle;
the articulation, the articulation configured to cause the front and rear parts of this vehicle to pivot relative to one another about its rotation axis;
a steering device for steering the wheel set of the front part;
the control device is programmed:
when it detects that it is situated in the first vehicle, to control the actuator of the articulation of that first vehicle to immobilize the articulation of the first vehicle in a position in which the front and rear parts of the chassis of that vehicle are aligned while leaving a driver of the first vehicle free to actuate the steering device of the first vehicle, and
when it detects that it is situated in one of the second vehicles, to control the actuator of the articulation to damp the measured oscillations and to inhibit actuation of the steering device by the driver of this second vehicle.

13. The convoy as claimed in claim 11, wherein the control device is programmed:
to automatically divide the moment for damping the measured oscillations between:
a moment MA equal to X*M that must be applied by the actuator to the articulation, and
a moment MR equal to (1−X)*M that must be applied to the articulation with aid of the electrical machines, wherein M is the total moment to be applied to the articulation to damp the oscillations and X is a real number between 0.2 and 1 inclusive when the absolute value of the difference $|\theta-\theta_0|$ increases and is equal to zero when the difference $|\theta-\theta_0|$ decreases, wherein $\theta$ is the angle of the articulation and $\theta_0$ is the articulation angle setpoint, then
to apply the moment MA to the articulation by controlling the actuator and, conjointly, to apply the moment MR to the articulation by controlling the electrical machines.

14. The convoy as claimed in claim 13, wherein the control device is programmed so that the real number X is systematically between 0.2 and 0.9 inclusive when the absolute value of the difference $|\theta-\theta_0|$ increases.

15. The convoy as claimed in claim 11, wherein the actuator is a cylinder with a controllable damping coefficient to brake rotation of the chassis parts that it mechanically connects to one another and incapable of moving in rotation relative to one another the same chassis parts.

* * * * *